United States Patent [19]

Naramura

[11] Patent Number: 5,562,183
[45] Date of Patent: Oct. 8, 1996

[54] FOOD MATERIAL CONVEYING MECHANISM

[75] Inventor: Michiyuki Naramura, Okayama-ken, Japan

[73] Assignee: Kabushiki Kaisha Kyowa Kogyosho, Okayama-ken, Japan

[21] Appl. No.: 380,962

[22] Filed: Jan. 31, 1995

[30] Foreign Application Priority Data

Feb. 2, 1994 [JP] Japan .................................. 6-010915
Feb. 2, 1994 [JP] Japan .................................. 6-010916

[51] Int. Cl.⁶ .............................. A21C 9/04; A23L 1/00
[52] U.S. Cl. ........................ 186/49; 99/450.4; 99/450.5
[58] Field of Search ............................ 99/357, 450.4, 99/450.5, 349, 373, 377, 443 C, 427, 450.1, 450.7; 414/223, 332; 221/123, 129; 186/38, 43, 44, 49, 50; 198/343.1, 345.3

[56] References Cited

U.S. PATENT DOCUMENTS

| | | | |
|---|---|---|---|
| 2,315,659 | 4/1943 | Russell | 186/49 |
| 3,384,497 | 5/1968 | Gassmann | 99/450.4 X |
| 3,575,265 | 4/1971 | Simjian | 186/49 |
| 4,202,260 | 5/1980 | Weger | 99/450.4 |
| 4,919,950 | 4/1990 | Mak | 99/357 X |
| 4,944,218 | 7/1990 | Cresson | 99/357 |
| 5,113,753 | 5/1992 | Robinson | 99/357 X |
| 5,113,754 | 5/1992 | Robinson et al. | 99/357 X |
| 5,121,677 | 6/1992 | Le Claire et al. | 99/357 |
| 5,365,835 | 11/1994 | Naramura | 99/450.5 |

FOREIGN PATENT DOCUMENTS 0296496  12/1988   European Pat. Off. ................. 99/357

*Primary Examiner*—Karen B. Merritt
*Assistant Examiner*—Scott L. Lowe
*Attorney, Agent, or Firm*—Thomas R. Morrison; Christopher R. Pastel

[57] ABSTRACT

A food material conveyor mechanism for a sandwich fixing apparatus includes a continuously moving conveyor line. A food conveying plate carried along the conveyor line is stopped at predetermined stop positions along the conveyor line so food materials can be automatically added to an unfinished sandwich. The mechanism is controlled by a microprocessor such that the food conveying plate is stopped only at selected stop positions depending on the type of sandwich ordered by a customer. The conveyor line continues to move even while individual conveying plates are stopped.

19 Claims, 8 Drawing Sheets

5,562,183

FOOD MATERIAL CONVEYING MECHANISM

BACKGROUND OF THE INVENTION

The present invention relates to a food material conveyor mechanism for a food material combining apparatus which incorporates a conveyor line, and in particular, to a food material conveyor mechanism for a sandwich preparation apparatus. The present invention also relates to a method of conveying food materials by means of the mechanism.

Fast-food sandwich shops sell various types of hamburgers and sandwiches according to a customer's request. The words "hamburger" and "sandwich" are interchangeably used in the specification unless otherwise specified. Customers readily and quickly receive what they want, making these shops very popular. In these shops, the required food material, such as buns, patties, vegetables, condiments, and sauces, is prepared by hand as is the ordered sandwich. Sandwiches are fixed and completed upon the customer's request instead of ahead of time to insure freshness and prevent deterioration in the taste of the sandwich.

A variety of hamburgers and sandwiches are in high demand at food outlets. The time necessary for manual preparation sometimes keeps customers waiting for long periods. Rapid preparation of orders is very important for fast-food outlets.

Food materials for hamburgers and sandwiches are relatively easy to fix manually. However, when a conveyor line is employed for quick preparation, additional food materials must be added onto food materials moving along the conveyor line. This task is not easy to perform. In addition, food materials vary in shape or nature, as with soft buns and grilled patties. Thus, different food materials need to be handled differently. The method of conveying these food materials in a conveyor line requires technological improvement.

OBJECTS AND SUMMARY OF THE INVENTION

It is hence a primary object of the present invention to provide an improved food material conveyor mechanism for a food material combining apparatus which includes a conveyor line.

It is another object of the present invention to provide a food material conveying method by making use of the food material conveyor mechanism.

The food material conveyor mechanism for the food material combining apparatus includes the conveyor line and a conveying plate. The conveyor line transfers the conveying plate from one area to another. The conveying plate receives various food materials which are combined into one unit. The shape of the conveying plate is formed for receiving one unit of combined food materials. The various food materials are added to the unit at different points according to the preparation sequence. The conveying plate is stopped at these points during the conveying process.

In order to control the movement of the conveying plate, the conveyor mechanism has a stopper which abuts the conveying plate at a stop position, i.e., a food supply position, along the conveyor line. The conveyor line continues to move while the conveying plate is stopped. The bottom of the stopped conveying plate slides over the moving conveyor line.

The stopper may be designed to activate automatically in response to a command from a microprocessor (CPU). Exactly which food materials are to be added to the unit vary from item to item. Therefore, the conveyor mechanism may be designed so that the conveying plate does not stop at the stop position for adding a specific food material if the ordered unit does not require it.

Briefly stated, a food material conveyor mechanism for a sandwich fixing apparatus includes a conveyor line and means for stopping a food conveying plate carried along the conveyor line. The food conveying plate is shaped to receive one unit of combined food materials, i.e., a sandwich, for carrying on the conveyor line. Stopping means are provided at predetermined stop positions along the conveyor line for stopping the conveyor plate so food materials can be automatically added to an unfinished sandwich. The mechanism is controlled by a microprocessor whereby the food conveying plate is stopped only at selected stop positions depending on the type of sandwich ordered by a customer. The conveyor line is continuously moving even while individual conveying plates are stopped.

According to an embodiment of the invention, a food material conveying method for combining food materials together includes the steps of providing at least one conveying plate for receiving a unit of combined food materials, mounting the conveying plate on a conveyor line, conveying the conveying plate on the conveyor line, the step of conveying including forwarding and stopping the conveying plate according to food material combining procedures, and adding a plurality of food materials onto the conveying plates.

According to an embodiment of the invention, a food material conveyor mechanism for combining food materials includes a food conveying plate, a conveyor line for carrying the food conveying plate, the food conveying plate formed for receiving a unit of combined food materials, means for stopping the food conveying plate at at least one stop position, and means for continuing the food conveying plate on the conveyor line.

According to an embodiment of the invention, a food material conveyor mechanism for combining food materials includes a conveying plate for receiving a unit of combined food materials, a conveyor line being slidable with respect to the food conveying plate, means for flow-wise stopping the food conveying plate, the flow-wise stopping means being projectable and provided at at least one predetermined stop position along the conveyor line, and the stopping means projecting to abut against the food conveying plate whereby the food conveying plate flow-wise stops while the conveyor line is kept moving.

According to an embodiment of the invention, a food material conveyor mechanism for a sandwich fixing apparatus includes a continuously moving conveyor line, a plurality of stop positions along the conveyor line, means for stopping a food conveying plate carried along the conveyor line at each of the stop positions while the conveyor line is continuously moving, means for selecting at least one of the stop positions, and means for controlling the stopping means whereby the food conveying plate is stopped only at the selected stop positions.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
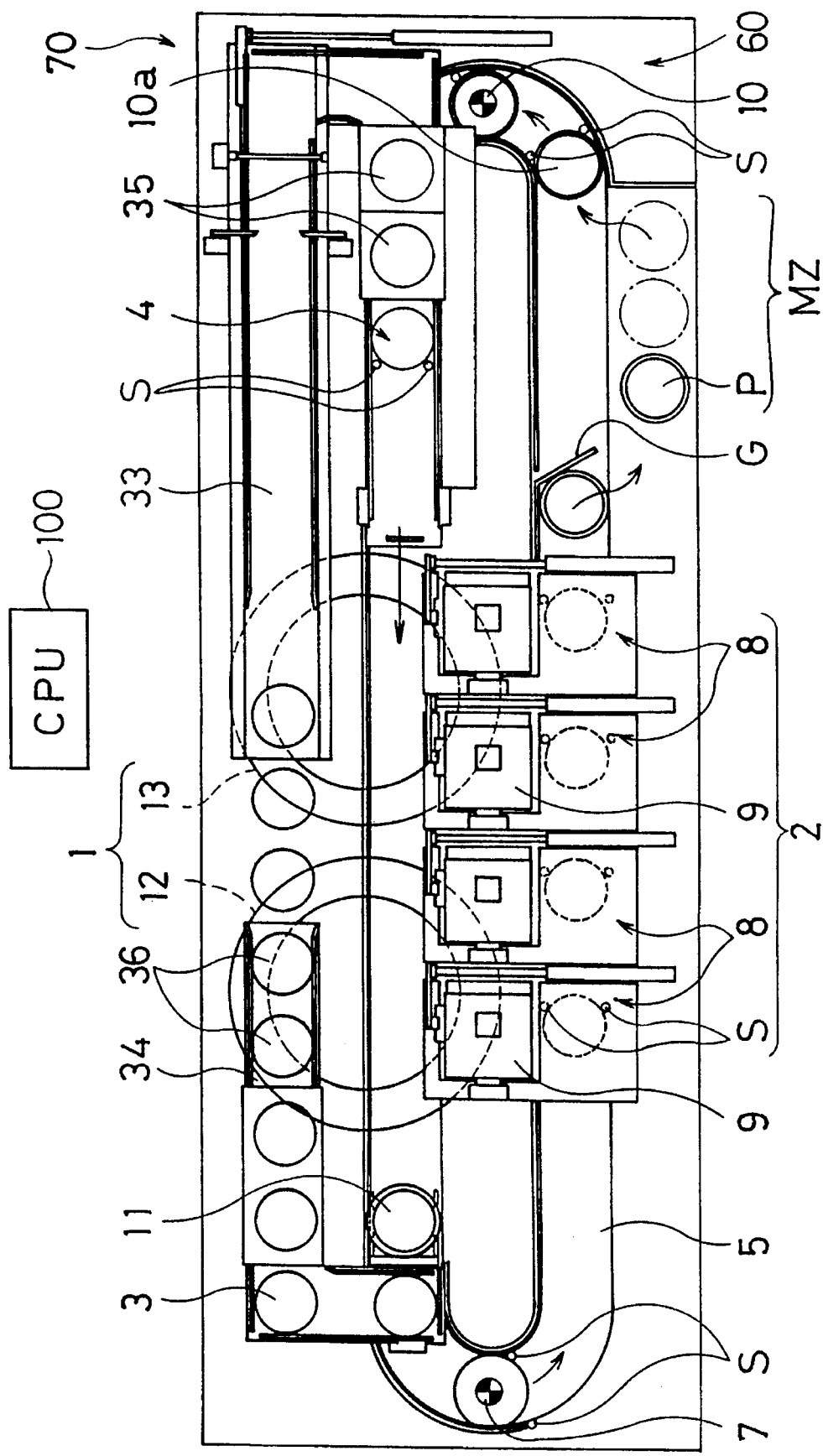
FIG. 1 is a plan view of a food conveyor mechanism for a sandwich fixing apparatus according to an embodiment of the present invention.

Referring to FIG. 1, a sandwich fixing apparatus 70 includes a bun supply mechanism 1, a patty supply mechanism 2, and a food material conveyor mechanism 60. A bun (not shown) is cut into two sections: a lower section known as a heel H, and an upper section known as a crown C. Heel H and crown C are toasted or warmed before a filling is placed therebetween to make a sandwich. The filling includes, for example, such items as a grilled patty, chicken, fried fish, cheese, bacon, vegetables, condiments, sauce and the like. The patty can be meat, vegetable, tofu, or the like. Food material conveyor mechanism 60

Figure 2:
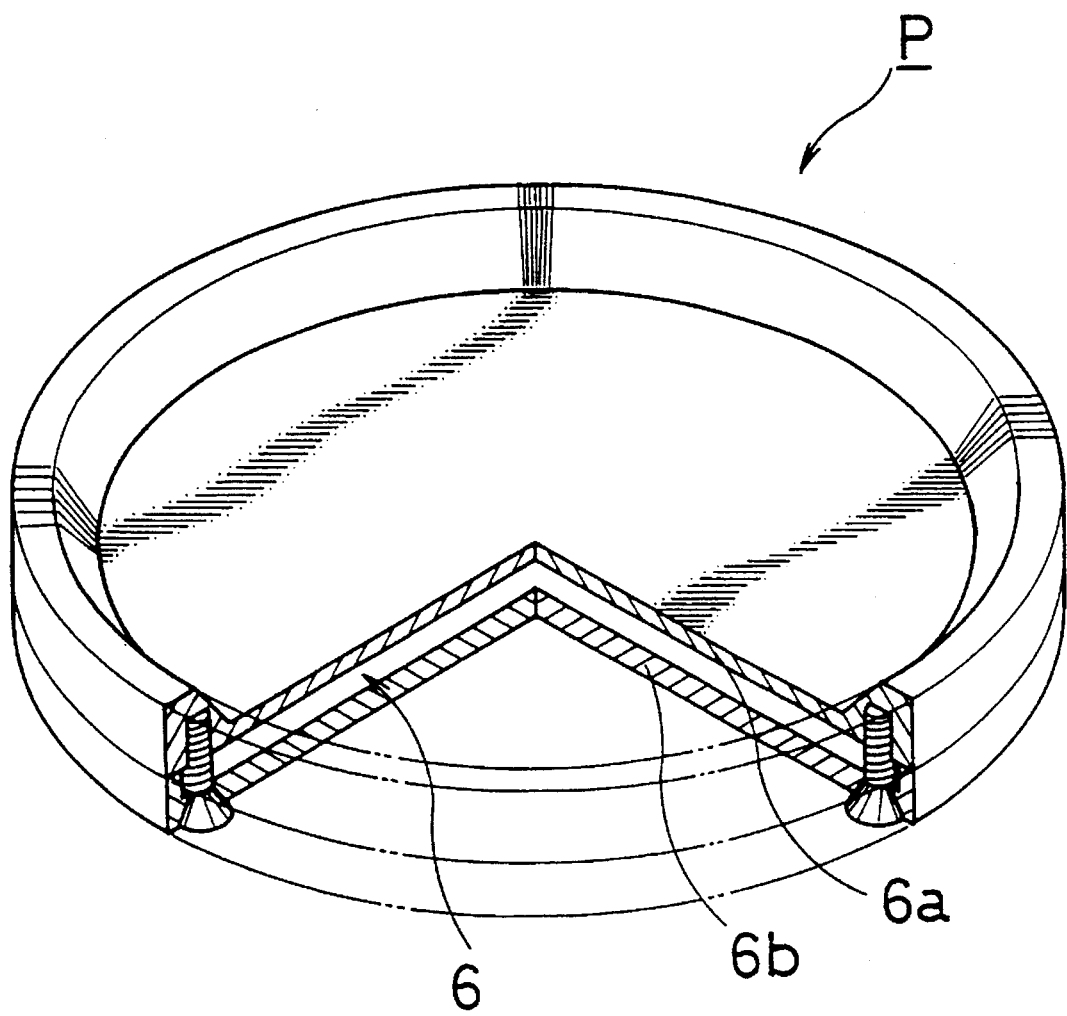
FIG. 2 is a partially cut-away perspective view of a conveying plate used in the embodiment of FIG. 1.

Referring also to FIG. 2, conveyor mechanism 60 includes a conveyor line 5 and a conveying plate P. Conveying plate P has a concave portion corresponding to a shape of heel H and is sized to receive one heel H. Each conveying plate P is thus designed to carry what becomes one sandwich at the end of the process. Conveying plate P moves on conveyor line 5, stops at a position where necessary, and then moves on to another position. During the movement, food materials for a sandwich are combined together according to a predetermined preparation order in response to a customer's request. In this embodiment, each food material is added in sequence while conveying plate P is stopped at a position. Using a plurality of conveying plates P allows the sandwich fixing apparatus to produce a plurality of sandwiches.

A heel supply position 3 and a crown supply position 4 mark the two extreme positions on conveyor line 5 where a food material is added. During the movement of conveying plate P from heel supply position 3 to crown supply position 4, additional required food materials are added either automatically or manually. At a certain point on the conveyor line, a guide G guides conveying plate P away from the flow of the conveyor line into a manual fixing zone MZ. Conveyor line 5 is driven continuously at a steady speed in a planar elliptical loop.

Referring also to FIG. 2, conveying plate P is made of aluminum, although any suitable metal, ceramic, or plastic material can be used. When made of metal, conveying plate P includes an upper layer 6a and a lower layer 6b separated by a hollow layer 6. In order to keep toasted, heated or grilled food materials hot, conveying plate P is pre-heated to about 80° C., preferably by a radiant heat source affecting upper layer 6a. Hollow layer 6 prevents heat from the pre-heated upper layer 6a of conveying plate P from conducting to a surface of conveyor line 5. Conveying plate P thus retains its heat longer.

Figure 3:
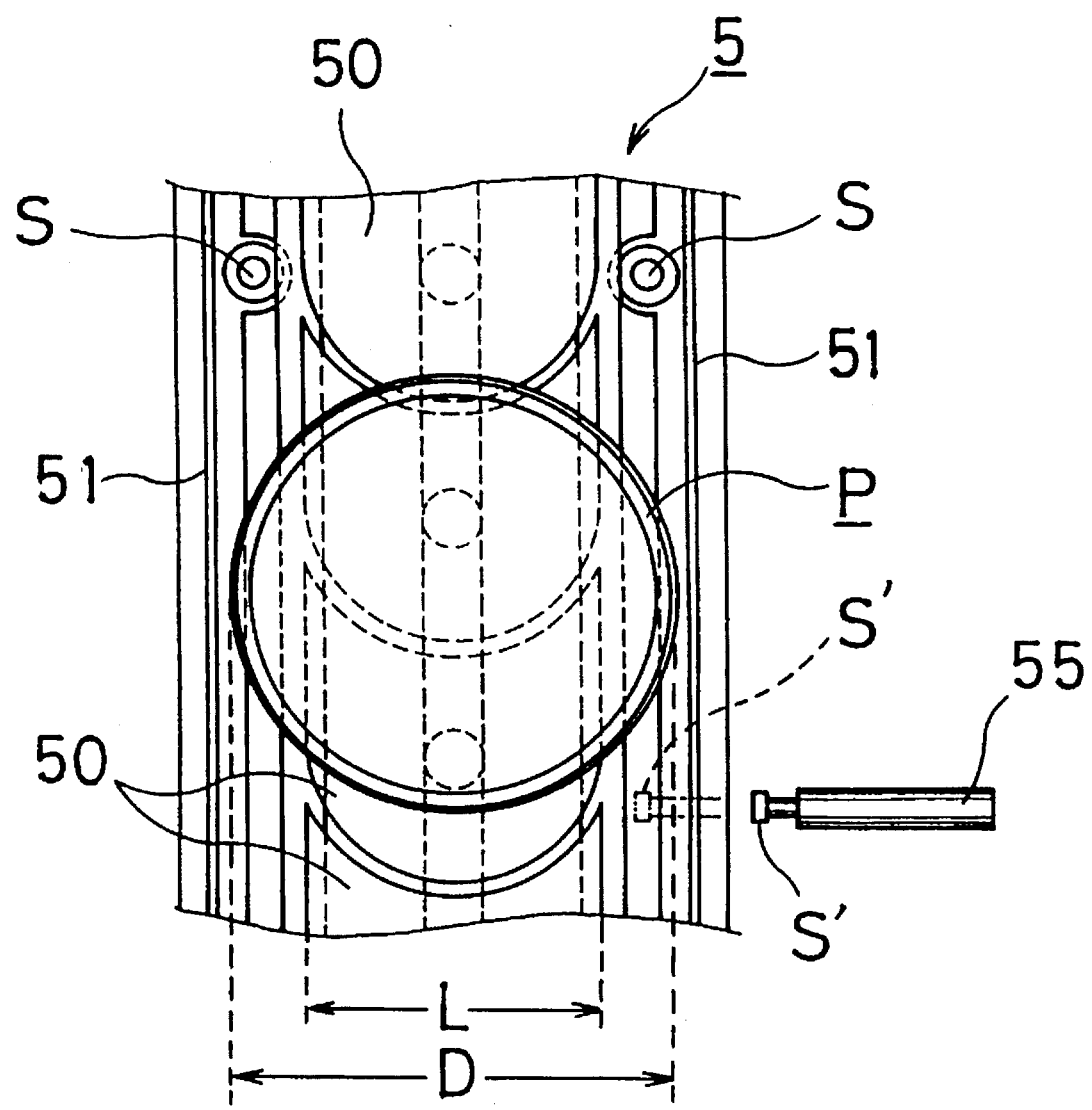
FIG. 3 is a fragmentary plan view of essential parts of a conveyor line of the food conveyor mechanism of FIG. 1.
Figure 4:
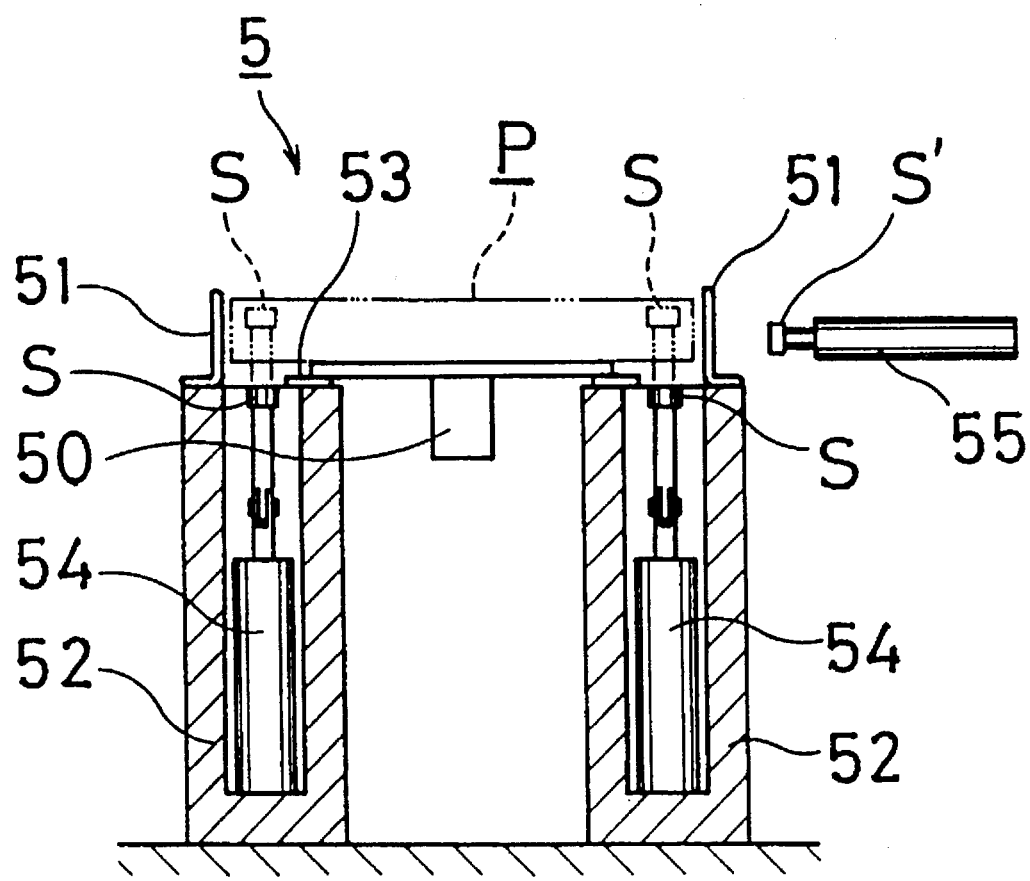
FIG. 4 is a sectional view of essential parts of the conveyor line of the food conveyor mechanism of FIG. 1.
Figure 5:
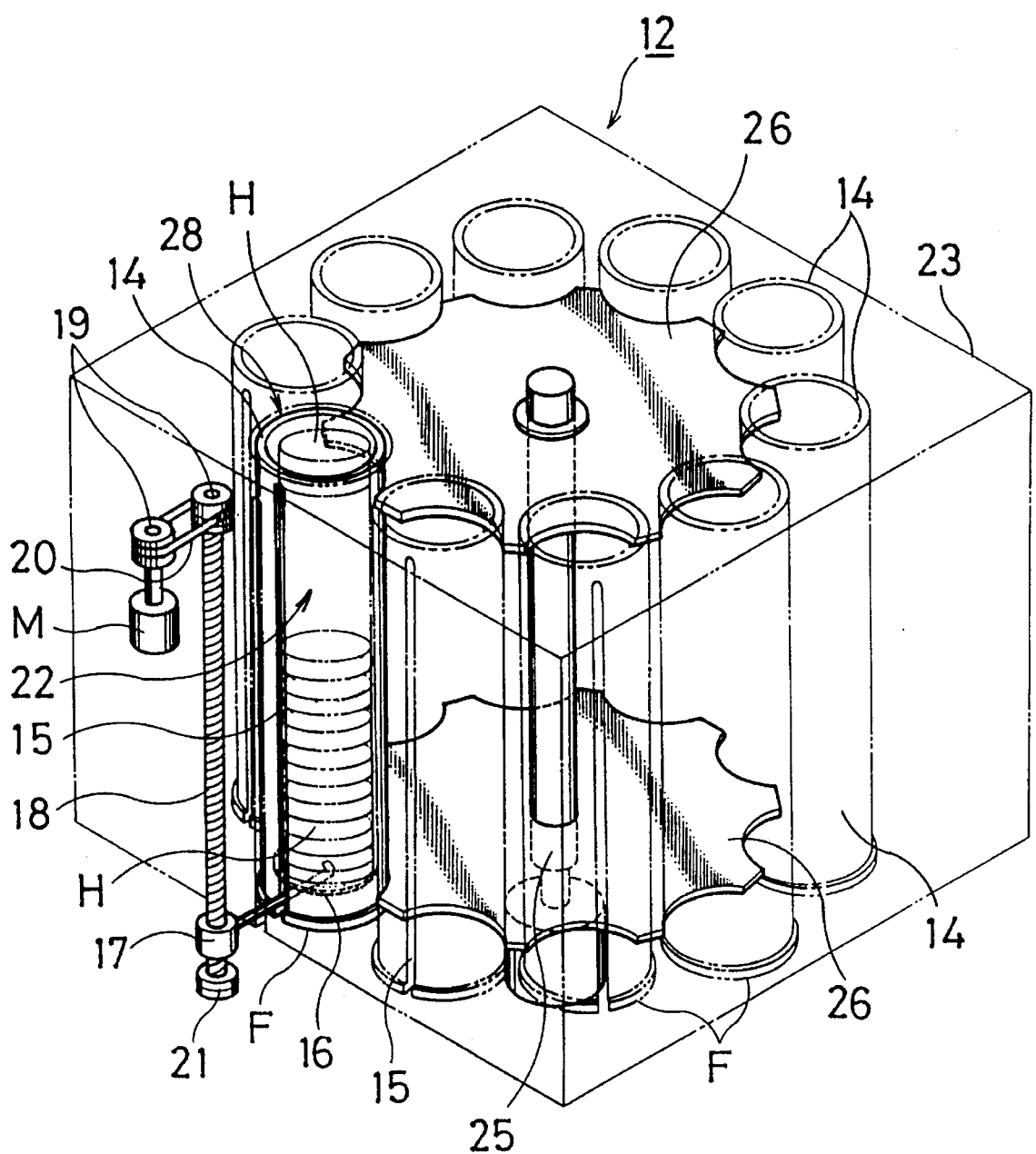
FIG. 5 is a perspective view of a heel supply mechanism of the sandwich fixing apparatus of FIG. 1.
Figure 6:
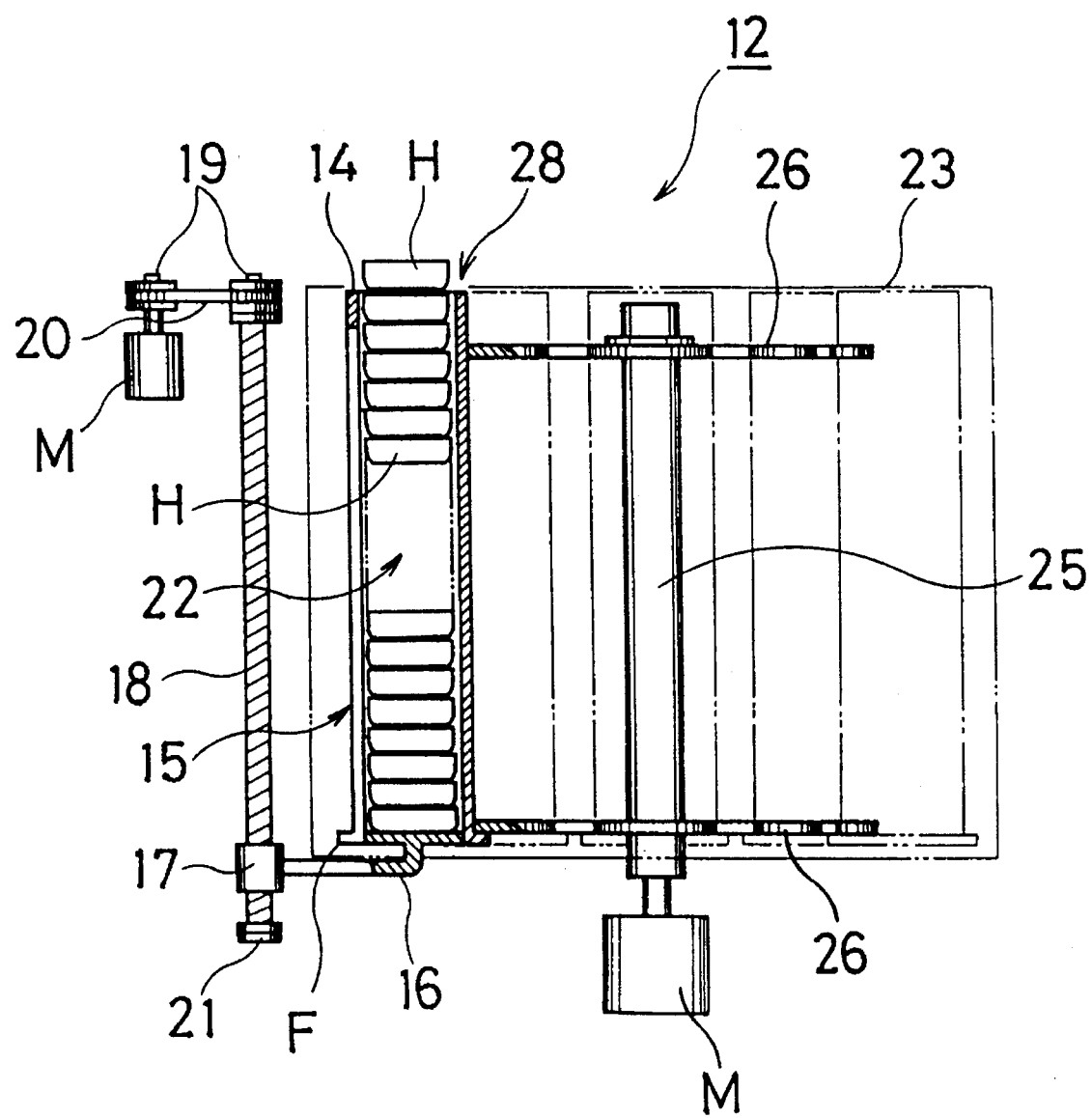
FIG. 6 is a fragmentary sectional view of the heel supply mechanism of FIG. 5.

Referring to FIGS. 3 and 4, conveyor line 5 includes a plurality of coupled links 50 driven by a chain (not shown). An outside diameter D of conveying plate P is slightly bigger than a width L of coupled links 50 on which conveying plate P is placed. Conveyor line 5 includes two supporting blocks 52, 52 that extend in parallel along the path of conveyor line 5. Conveying plates P are supported by links 50 and by two top link bases 53,53. Top link bases 53, 53 are on an upper edge of supporting blocks 52, 52. Two side guard plates 51, 51 are attached to each supporting block 52 along each side of conveyor line 5 for keeping conveying plates P on conveyor line 5.

As conveying plate P moves along conveyor line 5, conveying plate P stops at designated positions for the addition of required food materials. Stoppers S are disposed at these respective stop positions for stopping conveyor plate P. Conveyor line 5 is designed so that conveying plates P slide over the surface of links 50 as links 50 continue to move while conveyor plate P is stopped at a stop position. When stoppers S project into the flow of conveyor plates P, the stoppers abut against respective conveying plates P to stop them at the proper stop position.

Any conventionally known stoppers can be employed as stoppers S which project or extend into the flow of conveying plates P. As depicted in FIGS. 3 and 4, a pair of stoppers S are on both sides of conveyor line 5 at a stop position. Each stopper S is projected upward by a solenoid 54 contained within supporting blocks 52, 52 of conveyor line 5. When actuated, a pair of stoppers S project so that they partially block conveying plate P and hold it at the proper stop position.

Alternatively, another type of stopper may be used at the respective stop positions for conveying plate P. As depicted in FIGS. 3 and 4, a pair of stoppers S' (only one of which is shown in FIGS. 3–4), which are horizontally projectable or extendable, serve to block conveying plate P in its proper stop position. Stoppers S' are driven by air cylinders 55. Stoppers S and S' may be driven by electric actuators, fluid pressure actuators, or similar devices.

Referring back to FIG. 1, a plurality of stop positions along conveyor line 5 permit adding necessary food materials, such as sauces and condiments, to the unfinished sandwich. Conveyor line 5 is kept continuously moving while conveying plate P is stopped and forwarded, so that food materials for a sandwich are fixed in sequence while conveying plate P moves downstream on conveyor line 5 to complete as a sandwich.

When sandwich fixing apparatus 70 operates automatically or semi-automatically, stoppers S automatically actuate at necessary stop positions in response to commands from a CPU 100. Conveying plate P stops while necessary food materials (such as a sauce) are automatically delivered to the unfinished sandwich in response to the commands from CPU 100.

When a plurality of conveying plates P are used on conveyor line 5, CPU 100 tracks each individual conveyor plate P and its corresponding unfinished sandwich. Each conveyor plate P stops at the required stop positions for adding the specified food materials while conveyor line 5 keeps moving.

Sandwiches are prepared using sandwich fixing apparatus 70 as follows. First, a toasted heel (not shown) falls onto conveying plate P at a heel supply position 3 and is detected by a sensor (not shown). Conveying plate P is pushed onto conveyor line 5 in response to a command from CPU 100. Conveying plate P with the unfinished sandwich consisting of the toasted heel starts to flow down conveyor line 5. Since conveying plate P is preferably shaped to receive food materials for one sandwich, the toasted heel, which is soft, is smoothly carried on conveying plate P without deformation.

Conveying plate P arrives at a first sauce supply position 7 where it is detected by a sensor (not shown). Stoppers S are actuated to stop conveying plate P at this first stop position. Conveying plate P stops moving because of stoppers S, but conveyor line 5 keeps moving. Conveying plate P is detained until stoppers S are released.

At first sauce supply position 7, discharge nozzles (not shown) for various sauces are provided. The various sauces include, for example, hamburger sauce, teriyaki sauce, mayonnaise, tartar sauce, ketchup, mustard, etc. Each discharge nozzle is designed to be positioned nearly above a center of conveying plate P while stopped. In response to a command from CPU 100, one or more sauces necessary for a specific ordered item are discharged onto the toasted heel H of the unfinished sandwich. Upon completion of the sauce discharge at first sauce supply position 7, stoppers S are released by command of CPU 100. Conveying plate P continues to move forward along conveyor line 5. There are types of sandwiches which require no sauce at first sauce supply position 7. If conveying plate P is carrying an unfinished sandwich that requires no sauce at first sauce supply position 7, CPU 100 refrains from actuating stoppers S. Conveying plate P then passes through first sauce supply position 7 without stopping.

Conveying plate P arrives at a patty supply position 8 where it is detected by a sensor (not shown). Stoppers S are actuated to stop conveying plate P at this second stop position. Conveying plate P stops moving because of stoppers S, but conveyor line 5 keeps moving. Conveying plate P is detained until stoppers S are released.

In this embodiment, four patty supply positions provide grilled patties for sandwiches, but any number of patty supply positions can be used. When more than one patty supply position is used, CPU 100 is optionally programmed for a preferred operation. If only one patty supply position is in use, as during slow volume periods, CPU 100 activates stoppers S for that position only. If several patty supply positions are in use, CPU 100 activates stoppers S for that patty supply position that has an available grilled patty that is furthest downstream. Alternatively, the different patty supply positions can be used to provide patties grilled to different degrees of doneness. For example, one patty supply position can provide medium rare patties while another provides well-done patties.

At patty supply position 8, a patty, which has been waiting after being grilled by a grilling mechanism 9, is placed on the unfinished sandwich in stopped conveying plate P. When conveying plate P has an unfinished sandwich requiring no patty at this position, CPU 100 refrains from activating stoppers S. Conveying plate P then passes through patty supply position 8 without stopping.

Upon completion of the patty addition at patty supply position 8, stoppers S are released by command of CPU 100.

Conveying plate P continues to move forward along conveyor line 5 until it is directed into a manual fixing zone MZ by a guide G. Alternatively, guide G can be hinged and controlled by CPU 100. Guide G would only divert those unfinished sandwiches requiring manual attention.

Zone MZ is able to accumulate several conveying plates P. In this embodiment, four conveying plates P can be accumulated. Preferably, all required food materials for an ordered sandwich can be automatically fixed on conveyor mechanism 60 in response to commands from CPU 100. Alternatively, special food materials not supplied automatically can be added manually in zone MZ to accommodate customer demand. In addition, zone MZ provides flexibility, so that a new kind of sandwich can be introduced which includes food materials not available in the automatic sections of sandwich fixing apparatus 70. These new food materials for the new sandwich can be added manually in zone MZ.

In manual fixing zone MZ, various food materials, such as croquette, fried fish, chicken, lettuce, onion slice, cheese slice, pickle slice, special sauce or the like, are manually added to unfinished sandwiches on conveying plates P by an operator (not shown). Therefore, the operator must know what should be added to each of the unfinished sandwiches in zone MZ. To accomplish this, an order display board (not shown) is provided at a position easily seen by the operator. The board displays the kinds and numbers of unfinished sandwiches which are accumulating in the manual fixing zone M. Any conventional electronic display board that presents this information in a manner easily recognized at a glance may be used.

When the task of adding food materials to the unfinished sandwich in zone MZ is completed, the operator returns the conveying plate P to conveyor line 5 downstream of guide G. These returned conveyor plates P are stopped at a position 10a by stoppers S until released by CPU 100. If guide G diverts every conveying plate P to zone MZ, and the operator returns every conveying plate P to conveyor line 5 in precisely the same order as received, a sensor (not shown) at position 10a signals CPU 100 that conveying plate P has been returned to conveyor line 5. If either of the above conditions is not met, an input system (not shown) to CPU 100 is necessary.

Preferably, this input system (not shown) enables the operator to signal CPU 100 via an input panel precisely which ordered unfinished sandwich is at position 10a awaiting release. CPU 100 then uses this information to release stoppers S at position 10a and allow conveying plate P to continue moving downstream on conveyor line 5 to second sauce supply position 10. The order display board is updated by CPU 100 in response to the input by the operator.

When conveying plate P reaches second sauce supply position 10 and is detected by a sensor (not shown), stoppers S at this position are actuated to stop conveying plate P. Any additionally necessary sauces are added to the unfinished sandwich by discharge nozzles (not shown) for various sauces. The various sauces include, for example, hamburger sauce, teriyaki sauce, mayonnaise, tartar sauce, ketchup, mustard, etc. Each discharge nozzle is designed to be positioned nearly above a center of conveying plate P while stopped. In response to a command from CPU 100, one or more sauces necessary for a specific ordered item are discharged onto the unfinished sandwich. Upon completion of the sauce discharge at second sauce supply position 10, stoppers S are released by command of CPU 100. Conveying plate P continues to move forward along conveyor line 5. There are types of sandwiches which require no sauce at second sauce supply position 10. If conveying plate P is carrying an unfinished sandwich that requires no sauce at second sauce supply position 10, CPU 100 refrains from actuating stoppers S. Conveying plate P then passes through second sauce supply position 10 without stopping.

Conveying plate P continues downstream on conveyor line 5 to a crown supply position 4, where it is stopped by cooperation of a sensor (not shown) and stoppers S. Toasted crown C from a crown toasting position 35 is placed onto the unfinished sandwich in conveying plate P to complete fixing the ordered sandwich. Stoppers S are released after crown C is added. Conveying plate P is then sent to a conveying plate lifting mechanism 11 where it is removed from conveyor line 5.

Bun supply mechanism 1

Referring to FIGS. 5–8, bun supply mechanism 1 includes a heel supply mechanism 12 and crown supply mechanism 13. Heel supply mechanism 12 and crown supply mechanism 13 are similarly constructed, and like reference designators refer to like functions. Therefore, the description of heel supply mechanism 12 applies to crown supply mechanism 13 unless otherwise stated.

Heel supply mechanism 12 includes a bun stocker 23. Bun stocker 23 includes at least one tubular bun magazine 14. Both upper and lower ends of magazine 14 are open for storing heels H in a stacked state. A flange F is provided at the lower end of bun magazine 14. A notch groove 15 runs vertically on an outer circumference of bun magazine 14 and extends from the lower end to just before the upper end.

A lifting arm 16, designed for receiving heels H, is raised and lowered along and through notch groove 15. Moving lifting arm 16 upward moves stacked heels H through bun discharge port 28. Lifting arm 16 is coupled to a ball nut 17 which engages a ball screw 18. Ball screw 18 is rotated by a motor M driving a pulley 19 and a driving belt 20. Thus, motor M actuates lifting arm 16 which is coupled to ball nut 17. A bearing 21 is provided at an end of ball screw 18 for preventing ball nut 17 from disengaging ball screw 18.

In this embodiment, ten bun magazines 14 are detachably fitted inside bun stocker 23 and disposed in a circle. An upper end of a rotary shaft 25 is secured to bun stocker 23 by a bearing 27. A lower end of rotary shaft 25 extends through bun stocker 23 to a motor M'. A pair of upper and lower holding plates 26 at upper and lower ends of a rotary shaft 25 holds bun magazines 14 in place. The ten bun magazines 14 are detachably fitted to the outer portions of the upper and lower holding plates 26. Motor M' rotates rotary shaft 25, thereby moving bun magazines 14 to a bun discharging position 22 in a sequential fashion. When one bun magazine 14 is positioned in bun discharging position 22, heels H are fed out through bun discharge port 28 to a specific position. A rotation of rotary shaft 25 is controlled in a manner so that respective bun magazines 14 are positioned in turn at bun discharging position 22. When one bun magazine 14 at bun discharging position 22 becomes empty, a sensor (not shown) detects it. Then rotary shaft 25 is rotated by motor M' on command of CPU 100 so that a next bun magazine 14 moves to discharging position 22.

Figure 7:
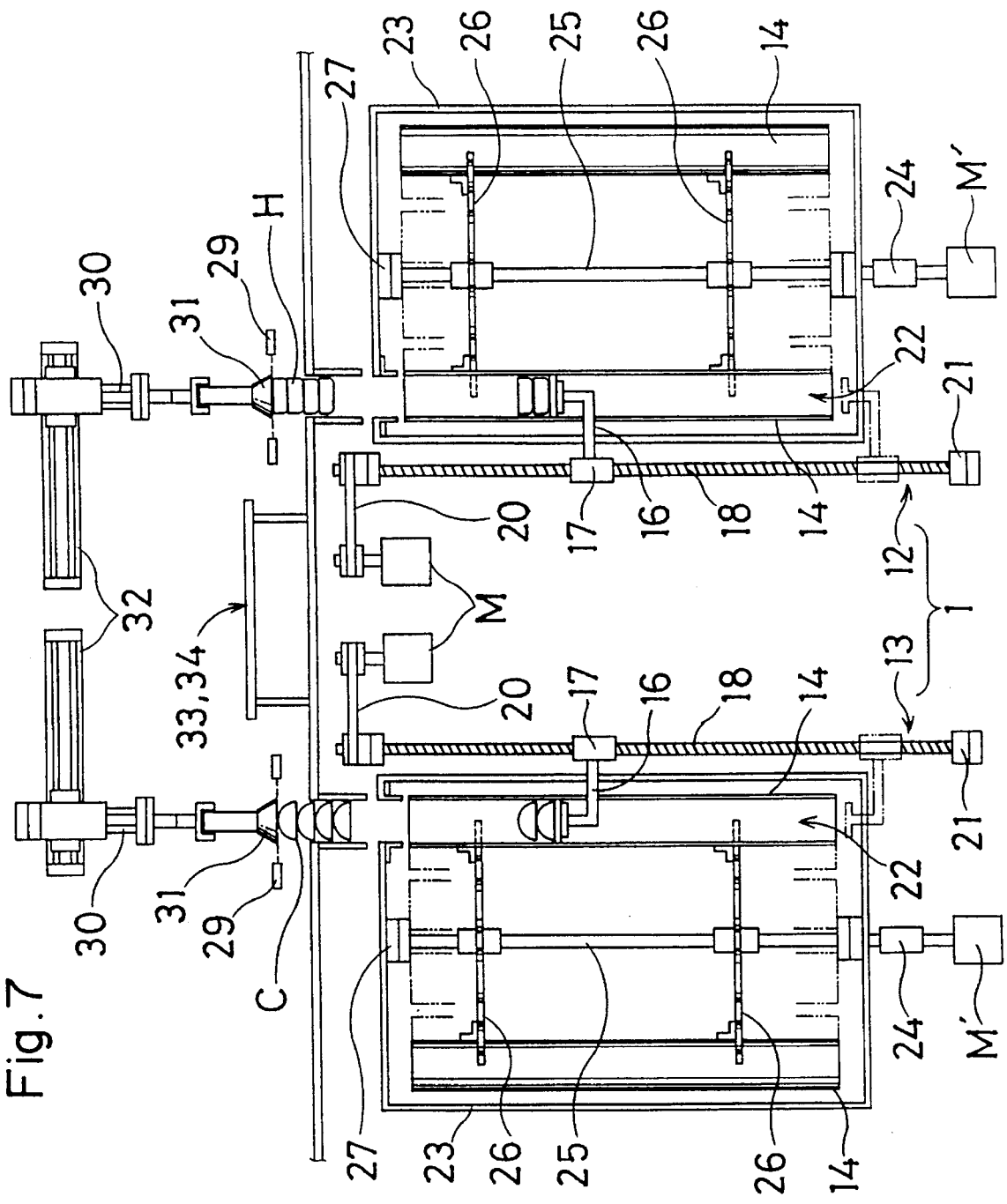
FIG. 7 is a fragmentary sectional view of a bun supply mechanism of the sandwich fixing apparatus of FIG. 1.
Figure 8:
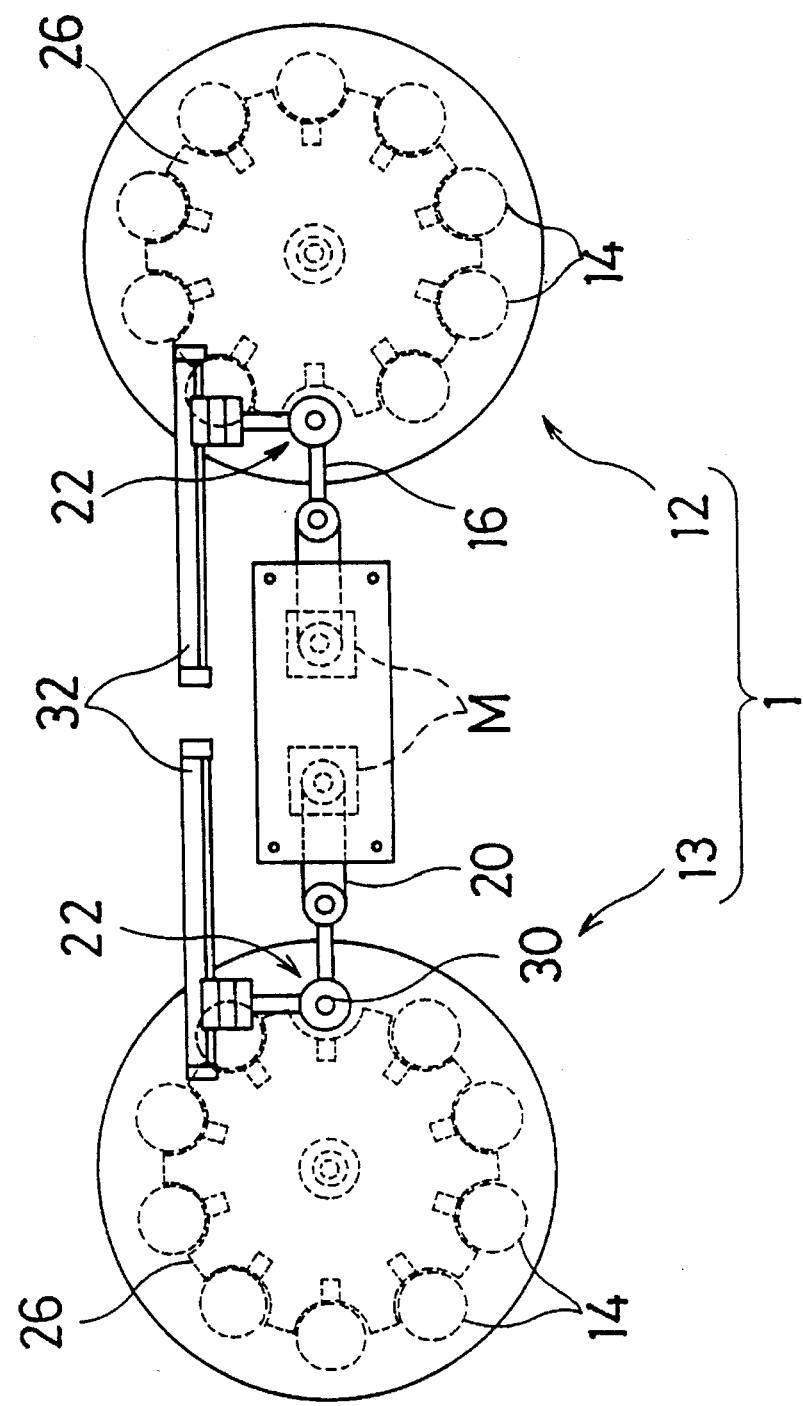
FIG. 8 is a plan view of the bun supply mechanism of FIG. 7.

Heel supply mechanism 12 operates as follows. Heels H are stacked vertically within each bun magazine 14 of bun stocker 23. In response to a command from the CPU 100, motor M raises lifting arm 16 so that a top heel H of the stack of heels H in bun magazine 14 is fed through discharge port 28 of bun stocker 23. When heel H reaches a certain level, it is detected by a sensor 29 which signals CPU 100 to stop motor M. In this way, each heel H in bun magazine 14 is moved to a same position. As depicted in FIG. 7, heels H are stored in bun stocker 23 of heel supply mechanism 12 while crowns C are stored in bun stocker 23 of crown supply mechanism 13. Crowns C are discharged from crown supply mechanism 13 in a fashion similar to the way heels H are discharged from heel supply mechanism 12.

In this embodiment, bun supply mechanism 1 supplies buns (heels H and crowns C) at a specific position so that it can be employed in an automatic or semi-automatic sandwich fixing apparatus. Since ten bun magazines 14 come to bun discharging position 22 in turn, when one bun magazine 14 is emptied, it need not be refilled immediately. Another bun magazine 14 rotates into position and commences discharging either heels H or crowns C. Therefore, with a minimum time loss, sandwiches are continuously produced and given to customers within a short time. Placing bun magazines 14 in a circle facilitates the rotation of bun magazines 14 to bun discharging position 22.

When a heel H in bun magazine 14 is fed through discharge port 28 of bun stocker 23, bun suction head 31, having a small fan (not shown) therein, is lowered by a lifting and sliding unit 30. When the fan is actuated, bun suction head 31 picks up heel H from bun stocker 23. Since respective heels H in bun magazine 14 are discharged to the same position, this process is ideally suited for automatic or semi-automatic operation. When bun suction head 31 picks up a heel H, it is raised to a specified level by lifting and sliding unit 30, whereupon a transverse sliding unit 32 moves it above a heel conveyor 34. Stopping the fan releases the suction, thereby dropping heel H onto heel conveyor 34. Crown supply mechanism 13 moves crowns C from discharge port 28 onto crown conveyor 33 in similar fashion.

Referring back to FIG. 1, crown C is sent to a crown toasting position 35 by crown conveyor 33 and toasted on top and bottom by a crown toasting heater (not shown). After being toasted, crown C waits to be placed on an unfinished sandwich on a conveying plate P at crown supply position 4. In this embodiment, two crown toasting heaters (not shown) are preferable, but any reasonable number will work. Heel H is sent to a heel toasting position 36 by heel conveyor 34 and toasted on top and bottom by a heel toasting heater (not shown). After being toasted, heel H is sent to heel supply position 3 and dropped onto conveying plate P. Two heel toasting heaters (not shown) are preferable, but any reasonable number will work.

Patty supply mechanism 2

Referring to FIG. 1, patties (not shown), supplied by patty supply mechanism 2, are stacked and supported by a patty lifting mechanism (not shown) in a patty freezer (not shown). Patty supply mechanism 2 is located in a region of sandwich fixing apparatus 70 so that grilled patties are available to an unfinished sandwich on conveying plate P downstream of first sauce supply position 7. In response to a command from CPU 100, the patty lifting mechanism lowers a stack of patties until only a bottom patty of the stack emerges from the patty freezer. A pushing mechanism (not shown) laterally pushes the bottom patty to grilling mechanism 9. The frozen patty is heated and grilled in grilling mechanism 9 on top and bottom by a pair of upper and lower ceramic heaters. This grilled patty waits there until being placed on the unfinished sandwich on conveying plate P. Preferably, since CPU 100 controls the timing of the various operations incorporated in sandwich fixing apparatus 70, the grilled patty is ready to be placed on the unfinished sandwich at substantially the same time the unfinished sandwich is ready to receive the grilled patty.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A food material conveyor mechanism for combining food materials, comprising:

a food conveying plate;

a continuously moving conveyor line for carrying said food conveying plate;

said food conveying plate formed for receiving a unit of combined food materials;

means for stopping said food conveying plate at at least one stop position; and means for continuing said food conveying plate on said conveyor line.

2. A food material conveyor mechanism according to claim 1, wherein said food conveying plate includes a concave portion for receiving a bottom portion of said unit of combined food materials.

3. A food material conveyor mechanism according to claim 2, wherein:

said unit of combined food materials is a sandwich; and said bottom portion is a heel of a bun.

4. A food material conveyor mechanism for combining food materials, comprising:

a conveying plate for receiving a unit of combined food materials;

a conveyor line being slidable with respect to said food conveying plate;

means for flow-wise stopping said food conveying plate;

said flow-wise stopping means being projectable and provided at at least one predetermined stop position along said conveyor line; and said stopping means projecting to abut against said food conveying plate wherein said food conveying plate flow-wise stops while said conveyor line is kept moving.

5. A food material conveyor mechanism according to claim 4, wherein said flow-wise stopping means are actuated in response to a command from a CPU.

6. A food material conveyor mechanism according to claim 4, further including means for controlling said flow-wise stopping means wherein said conveying plate stops only at designated stop positions.

7. A food material conveyor mechanism according to claim 4, wherein said unit of combined food materials is a sandwich.

8. A food material conveying method for combining food materials together comprising the steps of:

providing at least one conveying plate for receiving a unit of combined food materials;

mounting said conveying plate on a continuously moving conveyor line;

conveying said conveying plate on said conveyor line;

said step of conveying including forwarding and stopping said conveying plate according to food material combining procedures; and adding a plurality of food materials onto said conveying plates.

9. A method according to claim 8, wherein said step of adding food materials is conducted while said conveying plate is stopped.

10. A method according to claim 8, wherein, after said step of adding said plurality of food materials, said plurality of food materials forms a sandwich.

11. A food material conveyor mechanism for a sandwich fixing apparatus, comprising:

a continuously moving conveyor line;

a plurality of stop positions along said conveyor line;

means for stopping a food conveying plate carried along said conveyor line at each of said stop positions while said conveyor line is continuously moving;

means for selecting at least one of said stop positions; and means for controlling said stopping means wherein said food conveying plate is stopped only at a selected stop position.

12. A mechanism according to claim 11, wherein said stopping means comprises a stopper unit at each of said stop positions.

13. A mechanism according to claim 12, wherein said stopper unit comprises a pair of vertical stoppers.

14. A mechanism according to claim 12, wherein said stopper unit comprises at least one horizontal stopper.

15. A mechanism according to claim 11, wherein said controlling means comprises a microprocessor.

16. A mechanism according to claim 15, wherein said selecting means comprises:

an input panel for inputting an input to said microprocessor; and said microprocessor including means, responsive to said input, for determining said selected stop positions.

17. A mechanism according to claim 16, further comprising means for diverting said conveying plate from said conveyor line to a manual fixing zone.

18. A mechanism according to claim 17, wherein:

said diverting means is controlled by said microprocessor; and said microprocessor includes means, responsive to said input, for actuating said diverting means.

19. A mechanism according to claim 18, further comprising means for signalling said microprocessor that a diverted conveying plate is on said conveying line.

* * * * *